US010021423B2

(12) United States Patent
Westwater (10) Patent No.: US 10,021,423 B2
(45) Date of Patent: Jul. 10, 2018

(54) METHOD AND APPARATUS TO PERFORM CORRELATION-BASED ENTROPY REMOVAL FROM QUANTIZED STILL IMAGES OR QUANTIZED TIME-VARYING VIDEO SEQUENCES IN TRANSFORM

(71) Applicant: ZPEG, Inc., Austin, TX (US)

(72) Inventor: Raymond John Westwater, Austin, TX (US)

(73) Assignee: ZPEG, Inc., Austin, TX (US)

( * ) Notice: Subject to any disclaimer, the term of this patent is extended or adjusted under 35 U.S.C. 154(b) by 0 days.

(21) Appl. No.: 15/189,242

(22) Filed: Jun. 22, 2016

(65) Prior Publication Data

US 2016/0309190 A1  Oct. 20, 2016

Related U.S. Application Data

(63) Continuation of application No. 14/266,645, filed on Apr. 30, 2014, now abandoned.
(Continued)

(51) Int. Cl.
*H04N 19/625* (2014.01)
*H04N 19/91* (2014.01)
(Continued)

(52) U.S. Cl.
CPC ......... *H04N 19/625* (2014.11); *H04N 19/124* (2014.11); *H04N 19/129* (2014.11);
(Continued)

(58) Field of Classification Search
CPC .... H04N 19/625; H04N 19/182; H04N 19/63; H04N 19/124; H04N 19/176; H04N 19/14; H04N 19/18; H04N 19/129; H04N 19/91
See application file for complete search history.

(56) References Cited

U.S. PATENT DOCUMENTS 4,780,762 A  10/1988 Nagasaki
4,894,713 A   1/1990 Delogne et al.
(Continued)

OTHER PUBLICATIONS

Nadenau, "Wavelet-Based Color Image Compression: Exploiting the Contrast Sensitivity Function", IEEE Transactions on Image Porcessing, vol. 12, No. 1, Jan. 2003, pp. 58-70.
(Continued)

*Primary Examiner* — Joseph Suh
(74) *Attorney, Agent, or Firm* — Lee & Hayes, PLLC (57) ABSTRACT

Pure transform-based technologies, such as the DCT or wavelets, can leverage a mathematical model based on few or one parameters to generate the expected distribution of the transform components' energy, and generate ideal entropy removal configuration data continuously responsive to changes in video behavior. Construction of successive-refinement streams is supported by this technology, permitting response to changing channel conditions. Lossless compression is also supported by this process. The embodiment described herein uses a video correlation model to develop optimal entropy removal tables and optimal transmission sequence based on a combination of descriptive characteristics of the video source, enabling independent derivation of said optimal entropy removal tables and optimal transmission sequence in both encoder and decoder sides of the compression and playback process.

30 Claims, 9 Drawing Sheets

Related U.S. Application Data (60) Provisional application No. 61/818,419, filed on May 1, 2013.

(51) Int. Cl.
*H04N 19/129* (2014.01)
*H04N 19/14* (2014.01)
*H04N 19/18* (2014.01)
*H04N 19/124* (2014.01)
*H04N 19/176* (2014.01)
*H04N 19/182* (2014.01)
*H04N 19/63* (2014.01)

(52) U.S. Cl.
CPC ............ *H04N 19/14* (2014.11); *H04N 19/176* (2014.11); *H04N 19/18* (2014.11); *H04N 19/182* (2014.11); *H04N 19/63* (2014.11); *H04N 19/91* (2014.11)

(56) References Cited

U.S. PATENT DOCUMENTS

| | | | |
|---|---|---|---|
| 5,629,780 | A | 5/1997 | Watson |
| 5,737,020 | A | 4/1998 | Hall et al. |
| 5,751,358 | A * | 5/1998 | Suzuki .................. H04N 19/176 375/240.04 |
| 5,768,534 | A | 6/1998 | Guillote et al. |
| 5,933,193 | A | 8/1999 | Niesen |
| 5,936,669 | A | 8/1999 | Niesen |
| 5,953,460 | A | 9/1999 | Wu |
| 6,023,531 | A | 2/2000 | Peters |
| 6,222,887 | B1 * | 4/2001 | Nishikawa ............. H04N 19/46 375/240.26 |
| 6,239,811 | B1 | 5/2001 | Westwater |
| 6,252,989 | B1 | 6/2001 | Geisler et al. |
| 6,256,413 | B1 * | 7/2001 | Hirabayashi ......... H04N 19/176 375/E7.139 |
| 6,314,208 | B1 | 11/2001 | Konstantinides et al. |
| 6,347,157 | B2 | 2/2002 | Chui |
| 6,456,744 | B1 | 9/2002 | Lafe |
| 6,801,573 | B2 | 10/2004 | Zheng |
| 6,894,628 | B2 | 5/2005 | Marpe et al. |
| 6,990,247 | B2 | 1/2006 | Schwartz |
| 7,006,568 | B1 | 2/2006 | Gu et al. |
| 7,076,104 | B1 | 7/2006 | Keith et al. |
| 7,123,656 | B1 | 10/2006 | Reznik |
| 7,599,840 | B2 | 10/2009 | Mehrotra et al. |
| 7,634,145 | B2 | 12/2009 | Keith et al. |
| 7,684,981 | B2 | 3/2010 | Thumpudi et al. |
| 7,889,790 | B2 * | 2/2011 | Sun ...................... H04N 19/126 375/240.03 |
| 8,179,974 | B2 | 5/2012 | Tu et al. |
| 8,236,068 | B2 | 8/2012 | Aramata et al. |
| 8,306,340 | B2 | 11/2012 | Ceperkovic et al. |
| 8,326,067 | B2 | 12/2012 | Furbeck |
| 8,351,500 | B2 | 1/2013 | Shimofure |
| 8,432,967 | B2 * | 4/2013 | Hosaka ................. H04N 19/176 348/398.1 |
| 8,436,755 | B2 | 5/2013 | Korodi et al. |
| 2001/0004400 | A1 * | 6/2001 | Aoki ................ G08B 13/19602 382/107 |
| 2002/0168022 | A1 * | 11/2002 | Kim ....................... H04L 5/023 375/295 |
| 2002/0186772 | A1 * | 12/2002 | Li ........................ H04N 19/503 375/240.18 |
| 2003/0090591 | A1 * | 5/2003 | Concion ................ H04N 19/40 348/571 |
| 2003/0112333 | A1 | 6/2003 | Chen et al. |
| 2003/0142098 | A1 * | 7/2003 | Kim ....................... H04N 19/20 345/475 |
| 2003/0169928 | A1 * | 9/2003 | Stanek ..................... G06K 9/58 382/232 |
| 2003/0190086 | A1 | 10/2003 | Kim |
| 2004/0001611 | A1 * | 1/2004 | Celik ..................... G06T 1/0028 382/100 |
| 2004/0061709 | A1 * | 4/2004 | Park ...................... G09G 3/2033 345/690 |
| 2004/0062448 | A1 | 4/2004 | Zeng et al. |
| 2004/0066974 | A1 * | 4/2004 | Karczewicz ......... H04N 19/176 382/239 |
| 2004/0105590 | A1 * | 6/2004 | Akimoto .............. H04N 19/635 382/240 |
| 2004/0151243 | A1 | 8/2004 | Bhaskaran et al. |
| 2004/0190610 | A1 * | 9/2004 | Song .................... H04N 19/159 375/240.03 |
| 2004/0208362 | A1 * | 10/2004 | Suzuki ................ H04N 13/0029 382/166 |
| 2005/0008224 | A1 * | 1/2005 | Caruso ..................... H04N 1/644 382/166 |
| 2005/0105608 | A1 * | 5/2005 | Coleman .............. G06F 3/1454 375/240.01 |
| 2005/0157791 | A1 | 7/2005 | Sun |
| 2005/0165517 | A1 * | 7/2005 | Reich ...................... A63H 27/04 701/11 |
| 2005/0190836 | A1 | 9/2005 | Lu et al. |
| 2005/0207660 | A1 * | 9/2005 | Edgar .................... H04N 19/61 382/232 |
| 2005/0281479 | A1 * | 12/2005 | Song .................... H04N 19/139 382/275 |
| 2005/0286629 | A1 * | 12/2005 | Dumitras ............... H04N 19/61 375/240.03 |
| 2006/0062304 | A1 * | 3/2006 | Hsia ...................... H04N 19/159 375/240.16 |
| 2006/0098897 | A1 * | 5/2006 | Dewaele ................ G06K 9/6203 382/294 |
| 2006/0155531 | A1 * | 7/2006 | Miller .................. G10L 19/0017 704/219 |
| 2006/0164268 | A1 * | 7/2006 | Lee ....................... H04N 19/176 341/61 |
| 2006/0165311 | A1 | 7/2006 | Watson |
| 2006/0292837 | A1 * | 12/2006 | Gomila ..................... G06T 5/10 438/488 |
| 2007/0018906 | A1 * | 1/2007 | Visnovsky ................ G01J 3/02 345/1.1 |
| 2007/0071090 | A1 * | 3/2007 | Peng ..................... H04N 19/184 375/240.2 |
| 2007/0081589 | A1 * | 4/2007 | Kim ...................... H04N 19/159 375/240.03 |
| 2007/0121731 | A1 * | 5/2007 | Tanizawa ............. H04N 19/176 375/240.24 |
| 2007/0195737 | A1 | 8/2007 | Walker et al. |
| 2007/0230565 | A1 * | 10/2007 | Tourapis .............. H04N 19/105 375/240.01 |
| 2007/0263938 | A1 | 11/2007 | Lee et al. |
| 2007/0273939 | A1 * | 11/2007 | Kishida .................... H04N 1/6011 358/504 |
| 2008/0071764 | A1 * | 3/2008 | Omi ..................... G06F 17/30979 |
| 2008/0186348 | A1 * | 8/2008 | Yanai ..................... H04N 1/405 347/15 |
| 2008/0192824 | A1 * | 8/2008 | Lim ..................... H04N 19/147 375/240.03 |
| 2008/0298636 | A1 * | 12/2008 | Rasheed .............. G06K 9/00624 382/103 |
| 2009/0092099 | A1 | 4/2009 | Gu et al. |
| 2009/0232408 | A1 | 9/2009 | Meany |
| 2010/0054342 | A1 * | 3/2010 | Jang .................... H04N 21/6332 375/240.25 |
| 2010/0286991 | A1 * | 11/2010 | Hedelin ................ G10L 19/035 704/500 |
| 2010/0322597 | A1 * | 12/2010 | Gharavi-Alkhansari ......... H04N 19/176 386/328 |
| 2010/0324850 | A1 * | 12/2010 | Jung ......................... G11C 29/50 702/69 |
| 2010/0329329 | A1 * | 12/2010 | Reznik ................. G06F 17/147 375/240.2 |
| 2011/0075897 | A1 * | 3/2011 | Dekel .................... H04N 19/63 382/128 |
| 2011/0255589 | A1 | 10/2011 | Saunders et al. |

(56) References Cited

U.S. PATENT DOCUMENTS

| | | | |
|---|---|---|---|
| 2011/0268182 A1 | 11/2011 | Joshi | |
| 2011/0286525 A1* | 11/2011 | Kamisli | H04N 19/176 375/240.16 |
| 2012/0057629 A1 | 3/2012 | Shi et al. | |
| 2012/0133361 A1* | 5/2012 | Gross | G01R 33/5611 324/309 |
| 2012/0140819 A1* | 6/2012 | Kim | H04N 19/50 375/240.03 |
| 2013/0003829 A1* | 1/2013 | Misra | H04N 19/174 375/240.12 |
| 2013/0089137 A1* | 4/2013 | Korman | H04N 19/159 375/240.03 |
| 2013/0114703 A1* | 5/2013 | DeForest | H04N 19/00387 375/240.08 |
| 2013/0195206 A1* | 8/2013 | McCarthy | H04N 19/46 375/240.27 |
| 2013/0287104 A1* | 10/2013 | Jeong | H04N 19/00569 375/240.12 |
| 2013/0336594 A1* | 12/2013 | Dorairaj | H04N 19/126 382/250 |
| 2014/0003728 A1* | 1/2014 | Aoki | G06K 9/00228 382/218 |
| 2014/0051108 A1* | 2/2014 | Bernardi | C12Q 1/02 435/29 |
| 2014/0115472 A1* | 4/2014 | Mochinaga | H04N 13/0048 715/719 |
| 2014/0169407 A1* | 6/2014 | Terry | H04L 27/001 375/141 |
| 2014/0267432 A1* | 9/2014 | Dong | G06T 5/002 345/660 |
| 2014/0270331 A1* | 9/2014 | Zhao | G06T 1/005 382/100 |
| 2014/0286434 A1* | 9/2014 | Lee | H04N 19/82 375/240.16 |
| 2014/0327737 A1 | 11/2014 | Westwater | |
| 2014/0328406 A1 | 11/2014 | Westwater | |
| 2014/0376620 A1* | 12/2014 | Kondo | H04N 19/176 375/240.03 |
| 2015/0003707 A1* | 1/2015 | Amon | G06T 11/003 382/131 |
| 2016/0309189 A1 | 10/2016 | Westwater | |
| 2016/0309190 A1 | 10/2016 | Westwater | |

OTHER PUBLICATIONS

Office action for U.S. Appl. No. 14/266,757, dated Sep. 1, 2016, Westwater, "Method and Apparatus to Perform Optimal Visually-Weighed Quantization of Time-Varying Visual Sequences in Transform Space", 20 pages.

Office action for U.S. Appl. No. 14/266,645, dated Sep. 28, 2016, Westwater, "Method and Apparatus to Perform Correlation-Based Entropy Removal from Quantized Still Images or Quantized Time-Varying Video Sequences in Transform", 30 pages.

Office action for U.S. Appl. No. 15/189,187, dated Sep. 8, 2016, Westwater, "Method and Apparatus to Perform Optimal Visually-Weighed Quantization of Time-Varying Visual Sequences in Transform Space", 20 pages.

* cited by examiner

8010 → $DCT_x = \begin{pmatrix} \sqrt{1/4} & \sqrt{1/4} & \sqrt{1/4} & \sqrt{1/4} \\ \sqrt{\frac{2}{4}}*\cos(\frac{\pi}{8}) & \sqrt{\frac{2}{4}}*\cos(\frac{3\pi}{8}) & \sqrt{\frac{2}{4}}*\cos(\frac{5\pi}{8}) & \sqrt{\frac{2}{4}}*\cos(\frac{7\pi}{8}) \\ \sqrt{\frac{2}{4}}*\cos(\frac{2\pi}{8}) & \sqrt{\frac{2}{4}}*\cos(\frac{6\pi}{8}) & \sqrt{\frac{2}{4}}*\cos(\frac{10\pi}{8}) & \sqrt{\frac{2}{4}}*\cos(\frac{14\pi}{8}) \\ \sqrt{\frac{2}{4}}*\cos(\frac{3\pi}{8}) & \sqrt{\frac{2}{4}}*\cos(\frac{9\pi}{8}) & \sqrt{\frac{2}{4}}*\cos(\frac{15\pi}{8}) & \sqrt{\frac{2}{4}}*\cos(\frac{21\pi}{8}) \end{pmatrix}$

8020 → $A_{pixel,x} = \sigma^2_{pixel,x} \begin{pmatrix} 1 & \rho_x & \rho_x^2 & \rho_x^3 \\ \rho & 1 & \rho & \rho_x^2 \\ \rho_x^2 & \rho & 1 & \rho \\ \rho_x^3 & \rho_x^2 & \rho & 1 \end{pmatrix}$

8030 → $A_x = DCT * A_{pixel,x} * DCT^T$

8040 → $\sigma^2_{u,v,w} = \dfrac{A_x[u,u] * A_y[v,v] * A_z[w,w]}{Q_{u,v,w}}$

FIG. 8

9010 → $N_{MAX,u,v,w} = \left\lfloor \log_2\left(2^{N_{IN}} * \frac{\sqrt{xlen * ylen * zlen}}{Q_{u,v,w}}\right) \right\rfloor$

9020 → $p_{u,v,w}(x == 0) = CDF(0, \sigma^2_{u,v,w})\{-.5 < x < .5\}$

9030 → $p_{u,v,w}(\log_2(x) == n) = 2 * CDF(0, \sigma^2_{u,v,w})\{2^n - .5 < x, 2^{n+1} - .5\}$

9040 → $S_{u,v,w}(r, b) = \prod_{i=0}^{r-1} p_{(u,v,w)+i}(x == 0) * p_{(u,v,w)+r}(\log_2(x) == b)$

FIG. 9

METHOD AND APPARATUS TO PERFORM CORRELATION-BASED ENTROPY REMOVAL FROM QUANTIZED STILL IMAGES OR QUANTIZED TIME-VARYING VIDEO SEQUENCES IN TRANSFORM

CROSS-REFERENCE TO RELATED APPLICATION(S)

This application is a continuation of U.S. application Ser. No. 14/266,645, filed on Apr. 30, 2014, which is a non-provisional and claims benefit of a U.S. Provisional Application No. 61/818,419, filed on May 1, 2013.

BACKGROUND

The present invention relates generally to compression of still image and moving video data, and more particularly to the application of calculation of statistics of the behavior of the quantized transform representation of the video from the measured variances and the measured correlations in pixel space. Once the statistical behavior of the video is modeled, the video streams can be collected into successive refinement streams (progressive mode), and the probabilities of the constructed symbols can be calculated for the purposes of entropy removal. The measured variances and correlations suffice to reconstruct the compressed video streams for any frame or group of frames.

SUMMARY

In accordance with one aspect of the invention, a method is provided for the optimal rearrangement of components into a transmission stream based on the calculated variance of individual quantized transform components from the measured variance and correlation of the raw untransformed visual samples.

A second aspect of the invention provides a method for the optimal calculation of entropy reduction tables for a transmission stream based on the calculated symbol probabilities based on the calculated probability distributions of individual quantized transform components.

A final aspect of the invention provides a method for the parallel construction of transmission stream rearrangement, symbol construction and entropy tables between compressing apparatus and decompressing apparatus via communication of the measured variances and correlations of the raw untransformed visual samples.

DETAILED DESCRIPTION

Figure 1:
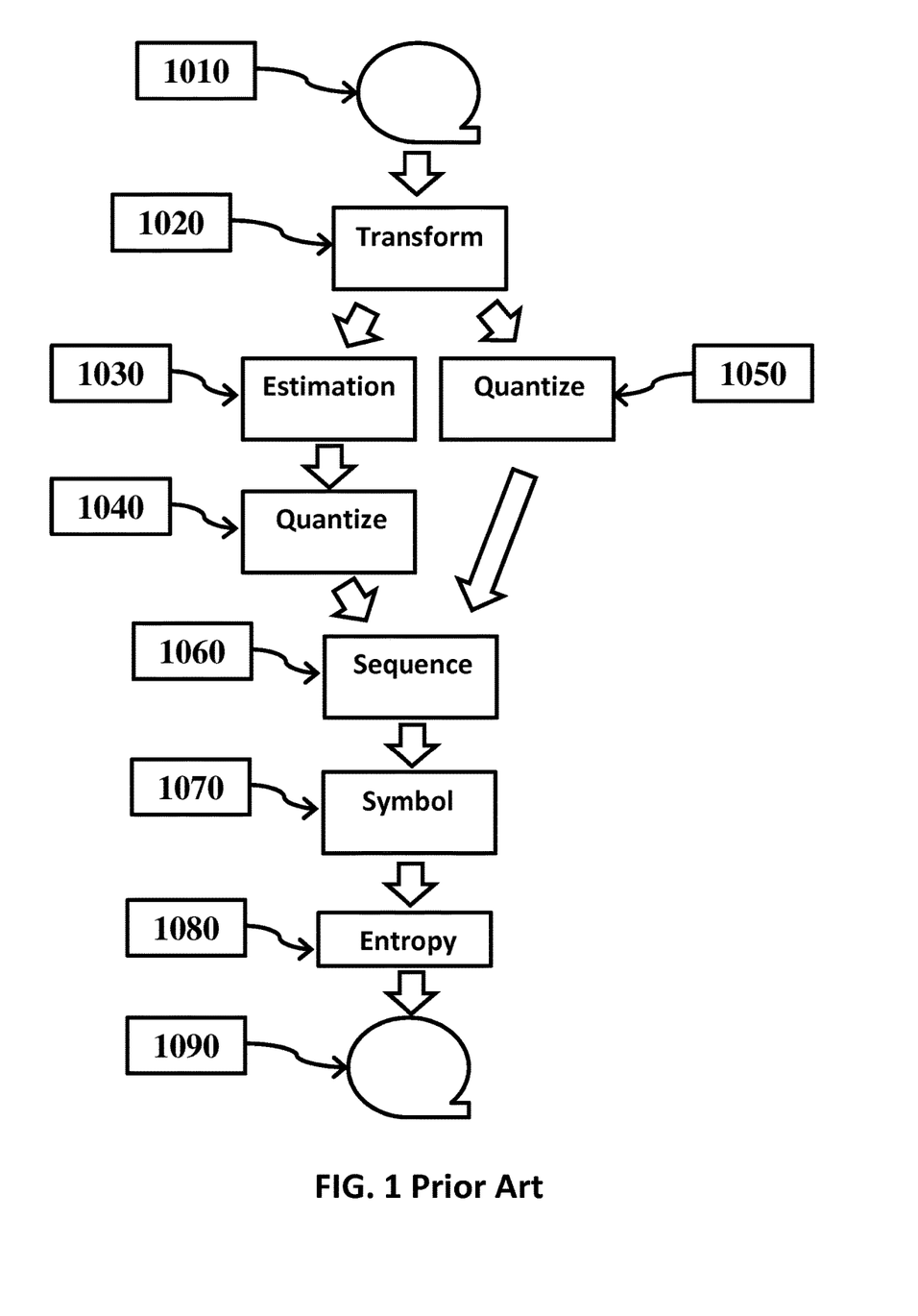
FIG. 1 depicts a prior-art compressor decomposed into the steps of transformation, quantization, transmission order sequencing, symbol collection, and entropy removal.

As depicted in FIG. 1, most prior-art still image and motion video compression algorithms perform a similar sequence of steps: an input stream 1010 is transform coded 1020, after which a process of motion estimation 1030 followed by equal-weight quantization 1040 or a process of visually-weighted quantization 1050 takes place, the resulting data is sequenced into transmission order 1060, symbols are collected 1070, and an entropy removal step 1080 results in a compressed data stream 1090. The essential innovation of the current invention is in the area of prediction of statistical behavior, which influences the process of transmission order sequence, symbol collection, and entropy removal. The current invention does not address the topic of motion estimation.

Figure 2:
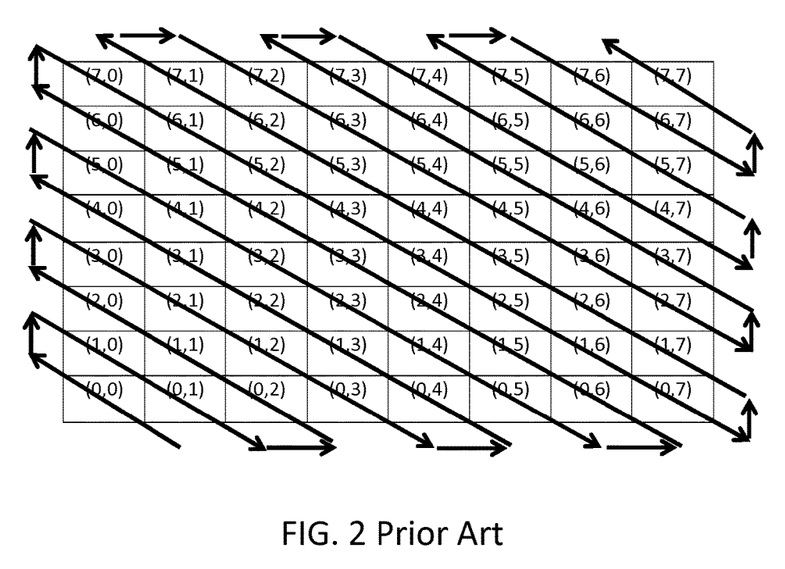
FIG. 2 depicts a prior-art compressor featuring per-block transmission order sequencing.

The JPEG zig-zag transmission order illustrated in FIG. 2 is a standard prior-art means of sequencing quantized coefficients into transmission order using a fixed pattern based on the average of statistics collected across a variety of sample content. The JPEG zig-zag order of increasing probability of zero. The JPEG zig-zag order is applied to one fixed-size block of the image at a time.

Figure 3:
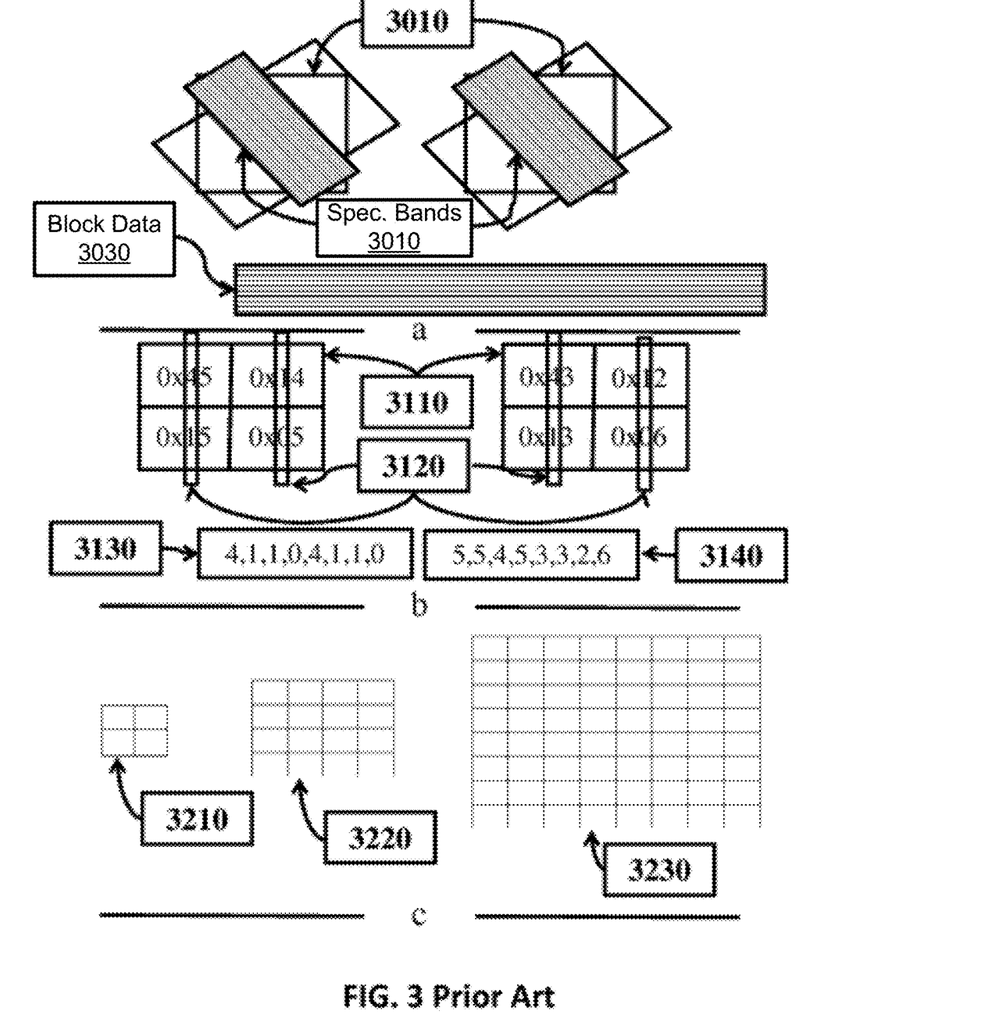
FIG. 3 depicts a prior-art compressor featuring three forms of progressive transmission order encoding; spectral selection, successive refinement, and hierarchical.

As depicted in FIG. 3, the prior-art JPEG-2000 standard implements various forms of progressive transmission, including spectral selection (FIG. 3a), successive refinement (FIG. 3b), and hierarchical (FIG. 3c). FIG. 3a depicts a plurality of two 8×8 quantized transform blocks 3010 covered by a plurality of three spectral bands, of which spectral band 3020 is typical. Data collected within the band across all blocks 3030 and symbols are collected from the data within each band, which is then entropy coded and transmitted.

FIG. 3b depicts a plurality of two 8×8 quantized transform blocks represented by a typical 2×2 entry 3110. The 2×2 entry of eight-bit numbers is divided into two successive refinement bands of four-bit representation, one of which is depicted 3120. The first four bits are collected across transform blocks into a transmission stream 3130 from which symbols will be collected and entropy coding will take place. The second four bits are similarly collected into transmission stream 3140.

FIG. 3c depicts a first-transmitted low-resolution image 3210, followed by a second-transmitted medium-resolution image 3220, and a final high-resolution image 3230. Each separate-resolution image is used to create its own transmission stream.

Figure 4:
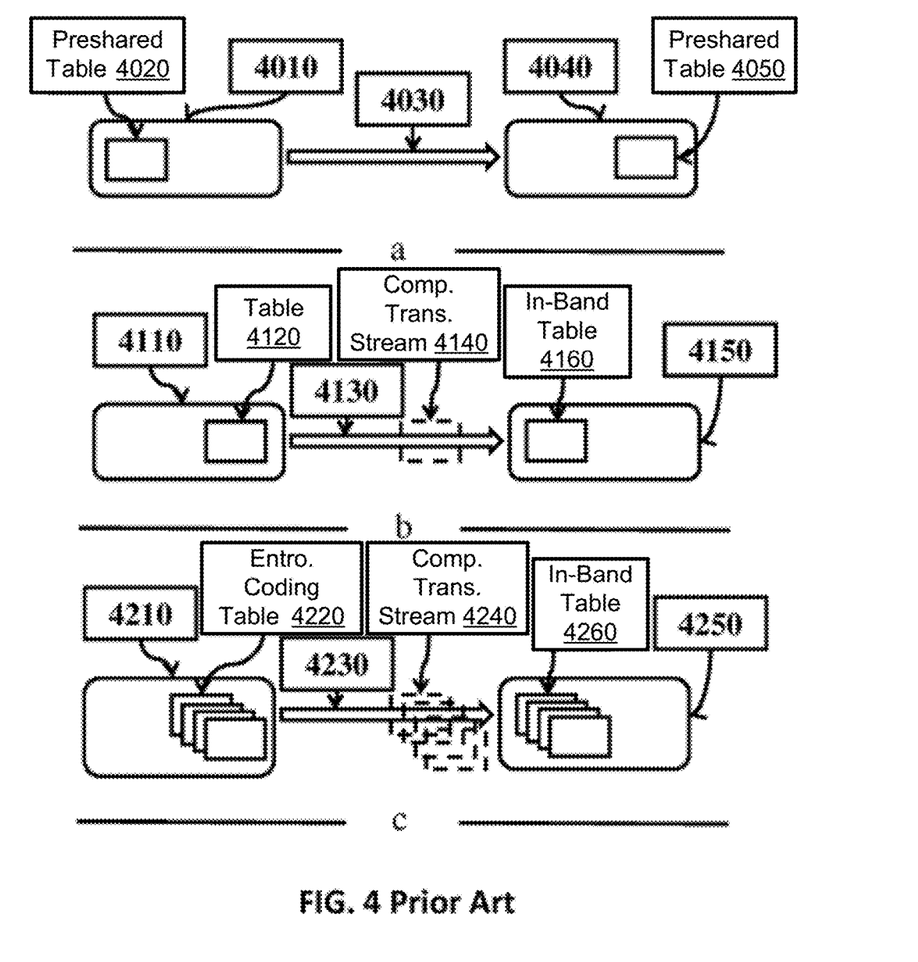
FIG. 4 depicts a prior-art compressor featuring various means of communication of entropy coding tables; pre-shared, in-band, and multiple tables.

FIG. 4 depicts typical prior-art means of communicating entropy encoding statistics between compressing and decompressing apparatuses. It should be noted that these entropy statistics may be represented directly as a table of relative probabilities for the purposes of arithmetic encoding, or as Huffman tables.

The original JPEG specification provides for a pre-defined entropy pre-shared encoding table as depicted in FIG. 4a. A preshared table 4020 is known to compressor 4010, and is used to generate the compressed data stream 4030. The preshared table 4050 known to the decompressor 4040 is used to decompress the received data stream. Pre-shared tables are intended to provide good compression based on the collection of statistics for a large collection of images.

As illustrated in FIG. 4b, tables may be dynamically calculated and embedded in the transmission stream. A compressor 4110 calculates a table 4120, which it then transmits in-band 4130 in the compressed transmission stream 4140. The decompressor 4150 reads an in-band table 4160 and uses it to decompress the following compressed stream. This strategy enables better compression at the overhead cost of hundreds to thousands of bytes.

Each JPEG-2000 progressive transmission approach described above in FIG. 3 requires assembly of symbols over each progressive decomposition step (spectral band, successively bit representation, or resolution), giving different symbols and symbol distributions. As depicted in FIG. 4c, a JPEG-2000 compressor 4210 calculates up to four entropy coding tables 4220 which it then transmits in-band 4230 in the compressed transmission stream 4240. The decompressor 4250 reads the in-band tables 4260 and uses them, as selected by each progressive stream, to decompress the following compressed data. If the tables are calculated to reflect typical progressive stream behavior, the tables may potentially be reusable.

Much effort has been expended in the incremental increase of efficiency in the communication of entropy coding statistics between compressing and decompressing apparatuses, but no significant advances can be claimed over the prior-are techniques described herein. The current invention discloses a far more efficient means of developing entropy tables independently in compressor and decompessor.

Figure 5:
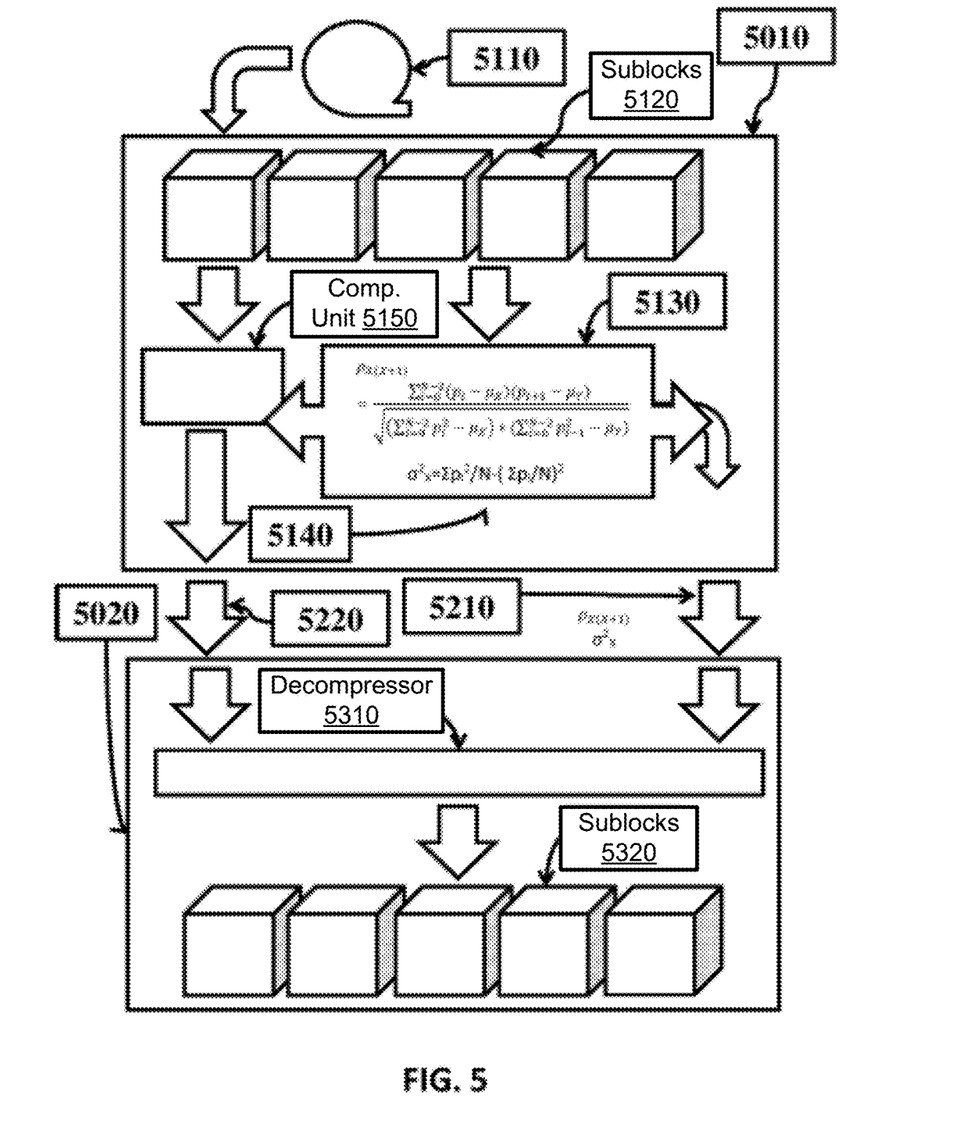
FIG. 5 depicts a typical embodiment of the current invention into a compression apparatus and a decompression apparatus.

FIG. 5 depicts a compression apparatus 5010 and a decompression apparatus 5020. Said compression apparatus 5010 is fed a sequential stream of visual data 5110, and factors said sequential stream of visual data 5110 into a plurality of multidimensional subblocks 5120. Said plurality of multidimensional subblocks 5120 is processed singly or jointly by a correlation measurement unit 5130 to produce a flow of measured variance values and measured correlation values to the decompression apparatus 5210 and a duplicate flow of measured variance values and measured correlation values to a compressor 5140. A compression unit 5150 uses said duplicate flow of measured variance values and measured correlation values to a compressor 5140 and said plurality of multidimensional subblocks 5120 to produce a compressed stream to the decompression apparatus 5220. Said decompression apparatus 5020 is compressed of a decompressor 5310 which processes said flow of measured variance values and measured correlation values to the decompression apparatus 5210 and said compressed stream to the decompression apparatus 5220 to produce a plurality of reconstructed multidimensional subblocks 5320.

Figure 6:
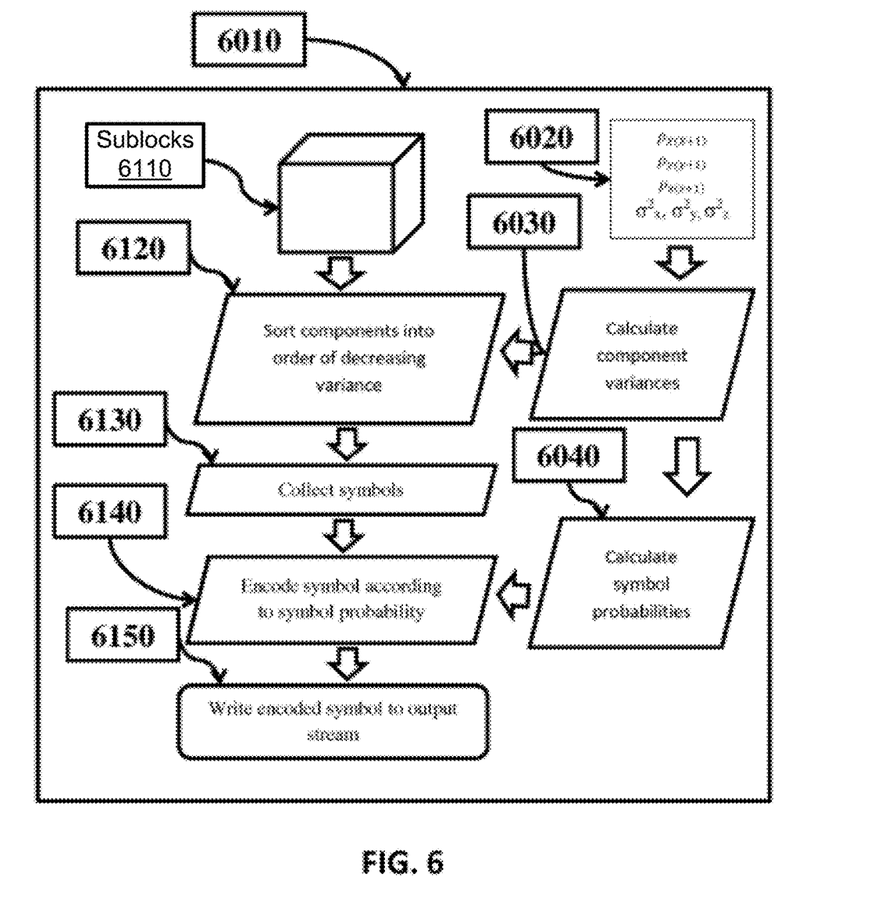
FIG. 6 depicts the steps typically required of a compression unit in order to perform block-by-block compression.

FIG. 6 depicts a decomposition of said compression apparatus 6010 into typical processing steps used to perform individual block-by-block compression. Said flow of measured variance values and measured correlation values to the decompression apparatus 5210 results in a set of variance values and correlation values in the x, y and z directions valid for one subblock 6110 of said plurality of multidimensional subblocks. Said set of kmeasured variance values and measured correlation values in the x, y and z directions valid for one subblock 6020 is processed through a step 6030 which calculates the variances for said quantized transform components of said one subblock 6110. In a further processing step 6040, said calculated variances for said quantized transform components of said one subblock from said step 6030 is used to calculate relative probabilities for each symbol.

The quantized transform components of said one subblock 6110 of said plurality of multidimensional subblocks processed through a step 6120 to reorder quantized transform components into order of greatest probability of zero (lowest variance). Said step 6120 uses said calculated variances for said quantized transform components from said step 6030 to perform its sort processing.

Said reordered quantized transform components are then processed through a step 6130 of collection of said reordered quantized transform components into symbols. Each said collected symbol is then processed through a step 6140 of entropy coding of said symbol into a short sequence of bits. Said step 6140 uses said calculated relative probabilities for each symbol from said step 6040 in its entropy-removing calculations.

Said short sequence of bits is finally processed through an aggregation step 6150 to concatenate generated bit sequences into a transport stream.

Figure 7:
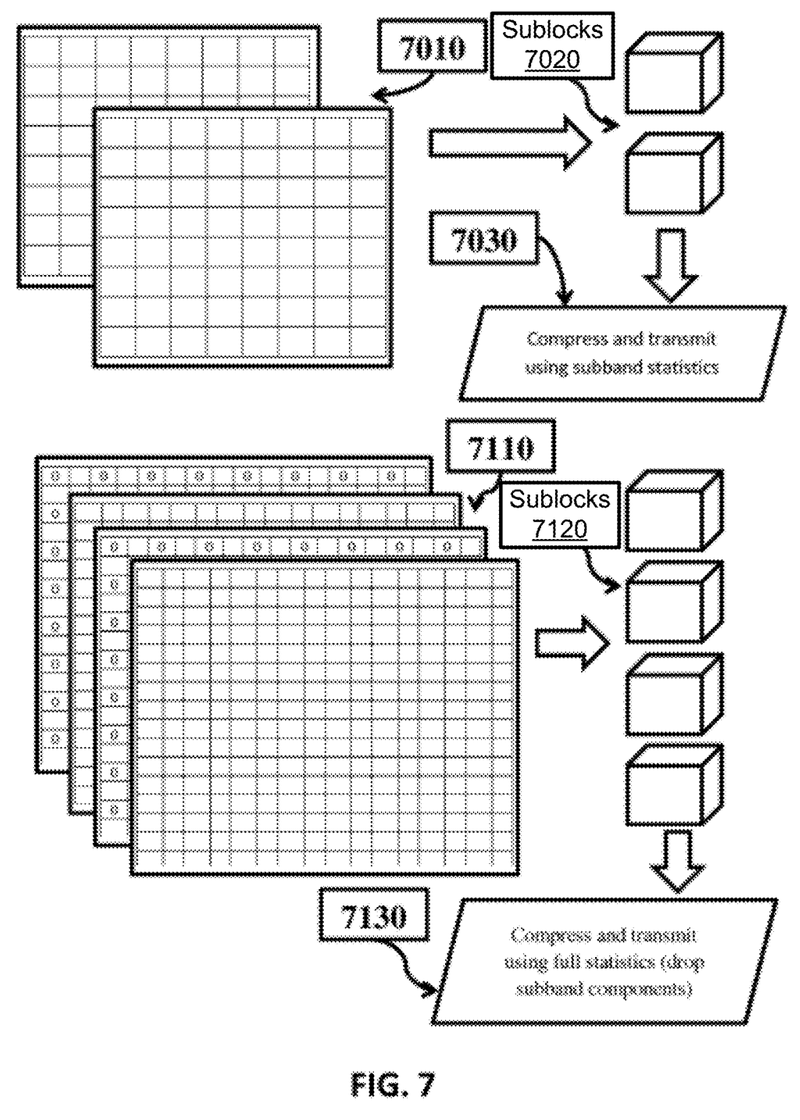
FIG. 7 illustrated hierarchical subband decomposition and compression.

FIG. 7 depicts a typical implementation of the hierarchical type of progressive transmission. A sequential stream of visual data 7010 is subsampled from said sequential stream of visual data 5110. Said subsampled sequential stream of visual data 7010 is factored into a plurality of multidimensional subblocks 7020. Said plurality of multidimensional subblocks 7020 is then processed subblock by subblock by said compression unit 5150 to produce a sequence of compressed bits for transmission.

Once said subsampled sequential stream of visual data 7010 has been processed through said compression unit 5150, a higher-resolution sequential stream of visual data less subband data 7110 may be processed. Said higher-resolution sequential stream of visual data less subband data 7110 is comprised of sequential stream of visual data 5110 where each and every coefficient comprising said subsampled sequential stream of visual data 7010 is set to 0 with a variance of 0. Said higher-resolution sequential stream of visual data less subband data 7110 is factored into a plurality of multidimensional subblocks 7120. Said plurality of multidimensional subblocks 7120 is then processed subblock by subblock by said compression unit 5150 to produce a sequence of compressed bits for transmission.

Figure 8:
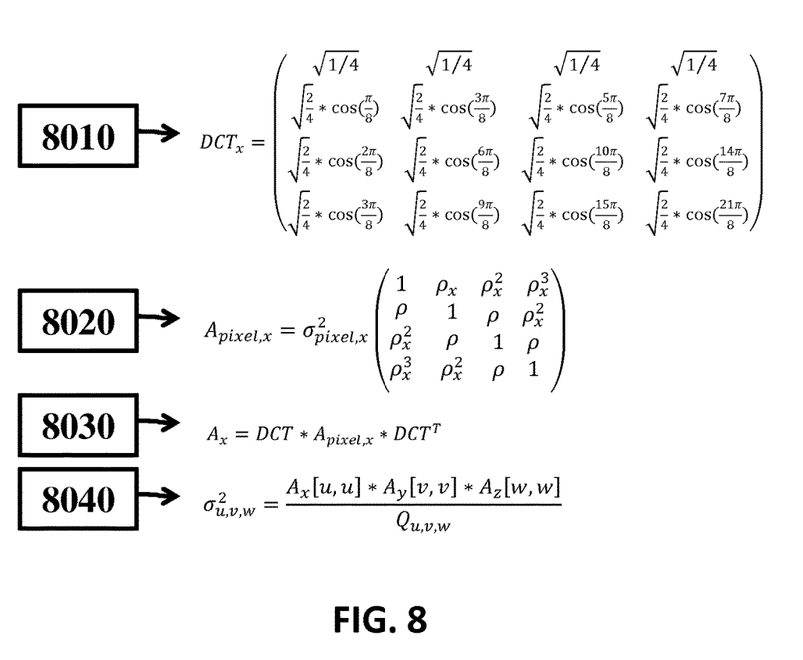
FIG. 8 illustrates the calculations required to model per-quantized transform component variance from pixel variance and pixel correlation.

FIG. 8 illustrates the calculations required to model per-quantized transform component variance from pixel variance and pixel correlation. A matrix DCTx 8010 is comprised of the individual constants of discrete cosine transform convolution. Said matrix DCTx 8010 is shown with the discrete cosine transform of a 4×4 convolution, but may in practice be composed of any orthonormal transform. Similar matrices DCTy and DCTz (in the case of three-dimensional said multidimensional subblocks 7120) will assume the length of each dimension of the said multidimensional subblocks 7020.

A covariance matrix Apixel,x 8020 is composed of the multiplication of said measured pixel variance in the x direction by the autocorrelation matrix derived from said measured pixel correlation in the x direction. Similar matrices Apixel,y and Apixel,z (in the case of three-dimensional said multidimensional subblocks 7120) will utilize the measured pixel variance, pixel correlations and length of each dimension of the said multidimensional subblocks 7020.

DCT covariance matrix x 8030 is calculated as the product of said matrix DCTx 8010, said covariance matrix Apixel,x 8020, and the transpose of said matrix DCTx 8010.

The variance of the quantized transform component 8040 of index u,v,w within said multidimensional subblocks 7020, a-2u,v,w, is calculated as the product of the trace of said DCT covariance matrix Ax 8030 with the trace of said DCT covariant matrix Av (and with the trace of said DCT covariant matrix Az if said multidimensional subblocks 7020 are three-dimensional) divided by the quantizer value for said quantized transform component 8040 of index u,v,w within said multidimensional subblocks 7020.

Figure 9:
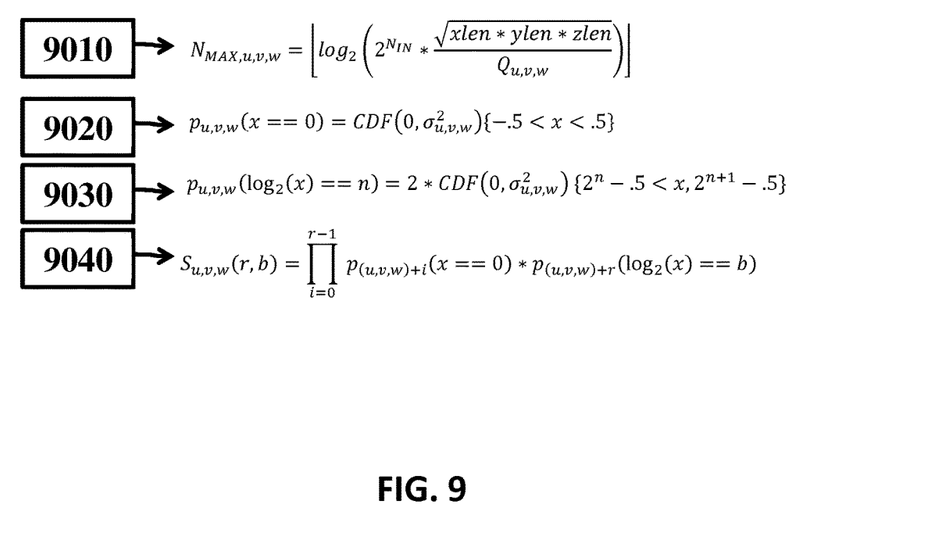
FIG. 9 illustrates the calculations required to model per-quantized transform component variance from pixel variance and pixel correlation.

FIG. 9 illustrates the process of calculating symbol probabilities. The maximum number of bits subblock N MAX, u,v,w 9010 required to encode any said quantized transform component of index u,v,w within said quantized transform is calculated as the rounded-up integer of the logarithm base 2 of the product of the number of bits representing each pixel N1N, the square root of the product of the lengths of said multidimensional blocks divided by the quantizer Ou,v,w of said quantized transform component.

The probability Pu,v,w(x==O) 9020 that any quantized transform component of index u,v,w within said quantized transform subblock is 0 is calculated from the Cumulative Distribution Function of a normal distribution with expectation of 0 and variance equal to that of said quantized transform component of index u,v,w within said quantized transform.

The probability Pu,v,w(log 2(x)==n) 9030 that any quantized transform component of index u,v,w within said quantized transform subblock has n bits in its representation is calculated from the Cumulative Distribution Function of a normal distribution with expectation of 0 and variance equal to that of said quantized transform component of index u,v,w within said quantized transform.

A typical symbol Su,v,w(r, b) 9040 comprised of a run length of r zeros followed by a non-zero value of length b is calculated as the conditional probability the each symbol in the order of said rearrangement of said quantized transform component within said quantized transform subblock. The probability of the ith quantized transform component following quantized transform component index u,v,w within said quantized transform subblock being 0 is written P(u,v,w)+i(x==O). The probability of the rth quantized.

While the present invention has been described in its preferred version or embodiment with some degree of particularity, it is understood that this description is intended as an example only, and that numerous changes in the composition or arrangements of apparatus elements and process steps may be made within the scope and spirit of the invention. In particular, rearrangement and recalculation of statistics may be made to support various modes of progressive transmission, including spectral banding or bitwise refinement. Further, pixel statistics may be measured and transmitted on a per-block or global basis, and may be measured in each dimension or averaged across all dimensions. Block sizes may also be taken to be as large as the entire frame, as would be typical when using the wavelet transform.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
   under control of one or more processors configured with executable instructions, receiving uncompressed visual data;
   measuring a plurality of characteristics of the uncompressed visual data, comprising:
   determining at least one measured variance associated with the uncompressed visual data, the at least one measured variance including one averaged value for each group of frames;
   determining at least one measured correlation coefficient associated with the uncompressed visual data, the at least one measured correlation coefficient including an averaged value for each of the groups of frames respectively corresponding to each of the groups of frames used to determine the at least one measured variance;
   specifying an orthogonal transform;
   specifying a block size associated with the orthogonal transform;
   specifying one or more quantizing coefficients associated with the specified orthogonal transform;
   determining calculated variances for the one or more quantizing coefficients from the at least one measured variance and the at least one measured correlation coefficient;
   applying the orthogonal transform to the uncompressed visual data to produce multiple blocks of transformed visual data;
   quantizing individual blocks of the transformed visual data by the quantizing coefficients to generate blocks of the quantized transformed visual data;
   calculating a probability distribution for the individual blocks of the quantized transformed visual data, each of the blocks of the quantized transformed visual data having the block size and wherein the calculating the probability distribution is based at least in part on the measured characteristics of the uncompressed visual data and the at least one of the calculated variances, the measured characteristics includes the at least one measured variance associated with the uncompressed visual data and the at least one measured correlation coefficient associated with the uncompressed visual data;

entropy encoding the blocks of the quantized transformed visual data based at least in part on a relative probability of each of the blocks of the quantized transformed visual data to generate entropy-coded blocks of the quantized transformed visual data; and transmitting or storing the plurality of characteristics of the uncompressed visual data and the entropy-coded blocks of the quantized transformed visual data.

2. The method of claim 1, further comprising:
collecting the individual blocks of the quantized transformed visual data into symbols based on a frequency band.

3. The method of claim 1, wherein
the at least one measured variances of the uncompressed visual data includes the averaged value for each of the blocks of the transformed visual data and the at least one correlation coefficients includes one averaged value per frame.

4. The method of claim 1, wherein
the at least one measured variances of the uncompressed visual data includes one averaged value for each of the blocks of the transformed visual data and the at least one correlation coefficients includes one averaged value for each of the blocks of the transformed visual data.

5. The method of claim 1, wherein
the at least one measured variances of the uncompressed visual data includes one averaged value for each of the blocks of the transformed visual data and the at least one correlation coefficients includes one averaged value per dimension of each of the blocks of the transformed visual data.

6. The method of claim 1, wherein
the at least one measured variances of the uncompressed visual data includes one averaged value for each of the blocks of the transformed visual data and the at least one correlation coefficients includes one averaged value per dimension of each of the blocks of the transformed visual data.

7. The method of claim 1, wherein
the at least one measured variances of the uncompressed visual data includes one averaged value per dimension for each group of frames and the at least one correlation coefficients includes one averaged value per dimension for each of the groups of frames.

8. The method of claim 1, wherein
the at least one measured variances of the uncompressed visual data includes one averaged value per dimension for each of the blocks of the transformed visual data and the at least one correlation coefficients includes one averaged value per dimension for the each of the blocks of the transformed visual data.

9. The method of claim 1, further comprising
transmitting or storing the at least one measured variance of the uncompressed visual data and the at least one measured correlation coefficient of the uncompressed visual data with the plurality of characteristics of the uncompressed visual data and the entropy-coded blocks of the quantized transformed visual data.

10. The method of claim 1, wherein
the orthogonal transform is a discrete cosine transform.

11. The method of claim 1, wherein
the uncompressed visual data comprises of two-dimensional still image.

12. The method of claim 1, wherein
the block size comprises the entire image.

13. The method of claim 1, wherein
the uncompressed visual data comprises a three-dimensional video data.

14. The method of claim 1, wherein
the block size is a number of frames by a size of a single frame.

15. The method of claim 1, further comprising
organizing the one or more quantizing coefficients associated into a decreasing order based on a component variance associated with each of the blocks of the transformed visual data.

16. The method of claim 1, further comprising
organizing the one or more quantizing coefficients into a decreasing order based on a component variance.

17. The method of claim 1, further comprising
organizing the one or more quantizing coefficients into bands of equal weight based on an order of decreasing component variance.

18. The method of claim 1, wherein
the entropy encoding the blocks of the quantized transformed visual data is based at least in part on a Huffman coding.

19. The method of claim 1, wherein
the entropy encoding the blocks of the quantized transformed visual data is based at least in part on an arithmetic coding.

20. The method of claim 1, wherein
the transform is an orthonormal wavelet.

21. The method of claim 1, wherein
the at least one measured correlation coefficient is calculated using the formula:

$$P_{X(X+1)} = \Sigma_{i=0}^{N-2}(p_i - \mu_X)(p_{i+1} - \mu_Y) / \sqrt{(\Sigma_{i=0}^{N-2} p_i^2 - \mu_X)*(\Sigma_{i=0}^{N-2} p_{i-1}^2 - \mu_Y)}.$$

22. The method of claim 1, wherein
the at least one measured variance is equal to $\Sigma p_i^2/N - (\Sigma p_i/N)^2$.

23. An method comprising:
determining a plurality of characteristics of uncompressed visual data, the plurality of the characteristics including at least one measured variance associated with the uncompressed visual data, the at least one measured variance including one averaged value for each group of frames and at least one measured correlation coefficient associated with the uncompressed visual data, the at least one correlation coefficient including one averaged value for each of the groups of frames respectively corresponding to each of the groups of frames used to determine the at least one measured variance; and specifying an orthogonal transform;
specifying a block size associated with the orthogonal transform;
specifying one or more quantizing coefficients associated with the specified orthogonal transform;
determining calculated variances for the one or more quantizing coefficients from the at least one measured variance and the at least one measured correlation coefficient;
applying the orthogonal transform to the uncompressed visual data to produce multiple blocks of transformed visual data;
quantizing individual blocks of the transformed visual data by the quantizing coefficients to generate blocks of the quantized transformed visual data;

calculating a probability distribution for the individual blocks of the quantized transformed visual data, each of the blocks of the quantized transformed visual data having the block size and wherein the calculating the probability distribution is based at least in part on the at least one measured characteristics of the uncompressed visual data and at least one of the calculated variances;

entropy encoding the blocks of the quantized transformed visual data based at least in part on a relative probability of each of the blocks of the quantized transformed visual data to generate entropy-coded blocks of the quantized transformed visual data; and sending the plurality of characteristics of the uncompressed visual data and the entropy-coded blocks of the quantized transformed visual data to another device.

24. The method of claim 23, wherein
the at least one measured variances of the uncompressed visual data includes one averaged value of a dimension for each of the multiple blocks of the transformed visual data and the at least one correlation coefficients includes one averaged value for a dimension of each of the multiple blocks of the transformed visual data.

25. The method of claim 23, wherein
the at least one measured variances of the uncompressed visual data includes one averaged value for each of the multiple blocks of the transformed visual data and the at least one correlation coefficients includes one averaged value per dimension of each of the multiple blocks of the transformed visual data.

26. The method of claim 23, further comprising
collecting the individual blocks of the transformed visual data into symbols based on a frequency band associated with individual ones of the plurality of transmission sequences.

27. The method of claim 23, wherein
the at least one measured correlation coefficient is calculated using the formula:

$$P_{X(X+1)} = \Sigma_{i=0}^{N-2}(p_i - \mu_X)(p_{i+1} - \mu_Y) / \sqrt{(\Sigma_{i=0}^{N-2} p_i^2 - \mu_X) * (\Sigma_{i=0}^{N-2} p_{i-1}^2 - \mu_Y)}.$$

28. The method of claim 23, wherein
the at least one measured variance is equal to $\Sigma p_i^2/N - (\Sigma p_i/N)^2$.

29. A method comprising:
under control of one or more processors configured with executable instructions, receiving uncompressed visual data;

measuring a plurality of characteristics of the uncompressed visual data, the plurality of characteristics including at least one measured variance associated with the uncompressed visual data, the at least one measured variance including one averaged value for each group of frames, and at least one measured correlation coefficient associated with the uncompressed visual data, the correlation coefficient including one averaged value for each of the groups of frames respectively corresponding to each of the groups of frames used to determine the at least one measured variance;

applying an orthogonal transform to the uncompressed visual data to produce multiple blocks of transformed visual data, each of the blocks of the transformed visual data having a specified block size;

quantizing individual blocks of the transformed visual data by specified quantizing coefficients to generate blocks of quantized transformed visual data, each of the blocks of the transformed visual data having the specified block size; and calculating a probability distribution for individual blocks of the quantized transformed visual data, each of the blocks of the quantized transformed visual data having the block size and wherein the calculating the probability distribution is based at least in part on the measured characteristics of the uncompressed visual data.

30. The method of claim 29, further comprising:
entropy encoding the blocks of the quantized transformed visual data based at least in part on the relative probability of each of the blocks of the quantized transformed visual data to generate entropy-coded blocks of the quantized transformed visual data; and transmitting or storing the plurality of characteristics of the uncompressed visual data and the entropy-coded blocks of quantized transformed visual data.

* * * * *